(12) United States Patent
Sato et al.

(10) Patent No.: US 10,005,420 B2
(45) Date of Patent: Jun. 26, 2018

(54) INFLATOR

(71) Applicant: TOYODA GOSEI CO., LTD., Kiyosu-shi, Aichi-ken (JP)

(72) Inventors: Makoto Sato, Kiyosu (JP); Yuji Kuriyama, Kiyosu (JP); Yoshio Ono, Kiyosu (JP); Keisuke Mori, Kiyosu (JP); Shinichiro Fuki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days. days.

(21) Appl. No.: 15/270,102

(22) Filed: Sep. 20, 2016

(65) Prior Publication Data
US 2017/0088090 A1 Mar. 30, 2017

(30) Foreign Application Priority Data
Sep. 30, 2015 (JP) .................. 2015-193802

(51) Int. Cl.
| | | |
|---|---|---|
| *B60R 21/272* | (2006.01) | |
| *B60R 21/01* | (2006.01) | |
| *B60R 21/264* | (2006.01) | |
| *B60R 21/26* | (2011.01) | |

(52) U.S. Cl.
CPC .......... *B60R 21/272* (2013.01); *B60R 21/01* (2013.01); *B60R 21/264* (2013.01); *B60R 21/2644* (2013.01); *B60R 2021/01129* (2013.01); *B60R 2021/26029* (2013.01); *B60R 2021/26058* (2013.01)

(58) Field of Classification Search
CPC . B60R 21/272; B60R 21/2644; B60R 21/264; B60R 21/01; B60R 2021/01129; B60R 2021/26058; B60R 2021/26029
See application file for complete search history.

(56) References Cited

U.S. PATENT DOCUMENTS

| | | |
|---|---|---|
| 5,669,629 A | 9/1997 | Rink |
| 5,884,938 A | 3/1999 | Rink et al. |
| 6,289,814 B1 | 9/2001 | Rink et al. |
| 6,332,404 B1 | 12/2001 | Rink et al. |
| 6,942,743 B2 | 9/2005 | Rink et al. |
| 2003/0136879 A1* | 7/2003 | Grabow ............... A62C 3/08 244/129.2 |
| 2004/0231770 A1 | 11/2004 | Bley et al. |
| 2010/0269484 A1* | 10/2010 | Baker ................ F02K 9/563 60/204 |

FOREIGN PATENT DOCUMENTS

EP     2267293 A2 * 12/2010 ............. F02G 1/047

* cited by examiner

*Primary Examiner* — Drew J Brown
(74) *Attorney, Agent, or Firm* — Posz Law Group, PLC

(57) ABSTRACT

An inflator includes an inflator body that produces an inflation gas by burning a gas generating agent and a sensor that is mounted on the inflator body and is capable of detecting a degradation of the gas generating agent. The sensor is preferably composed of at least either one of a gas sensor, a pressure sensor, or a temperature sensor.

6 Claims, 3 Drawing Sheets

INFLATOR

CROSS REFERENCE TO RELATED APPLICATIONS

The Present application claims priority from Japanese Patent Application No. 2015-193802 of Sato et al., filed on Sep. 30, 2015, the entire disclosure of which is incorporated herein by reference.

BACKGROUND OF THE INVENTION

1. Field of the Invention

The present invention relates to an inflator which produces an inflation gas to inflate and deploy an airbag of an airbag device in the event of a collision of a vehicle or the like.

2. Description of Related Art

An inflator is mounted on an airbag device for mounting on a vehicle or the like. The inflator is filled with a gas generating agent and/or a compressed gas and produces an inflation gas out of the gas generating agent and/or compressed gas for inflating an airbag instantly for protecting a vehicle occupant in the event of a collision.

JP2002-537208 A and JP2001-517575 A disclose inflators wherein a gas leak tracer such as odor-intensive material or a radioactive isotope is added to a gas generating agent and/or a compressed gas whereby a gas leakage can be detected.

However, the inflators disclosed in the above-identified prior art references are capable of detecting a problem of the inflator only through a detection of gas leakage. There is a further demand for detecting a degradation of a gas generating agent stored in the inflator since a degraded gas generating agent is highly likely to fail to exert a predetermined power when ignited.

SUMMARY OF THE INVENTION

An object of the present invention is to provide an inflator which is capable of detecting a degradation of a gas generating agent stored therein.

The object of the invention will be achieved by a following inflator.

The inflator includes an inflator body that generates an inflation gas by burning a gas generating agent and a sensor that is mounted on the inflator body and is capable of detecting a degradation of the gas generating agent. Such an inflator will be capable of informing a user of the degradation of the gas generating agent. When the degree of degradation is such as to necessitate a replacement of the inflator, the inflator or an airbag device equipped with the inflator can be replaced with a new one. Therefore, the inflator of the invention is capable of exerting a desired power when actuated.

It is preferable that the sensor is composed of at least either one of a gas sensor, a pressure sensor or a temperature sensor.

With such a configuration, the sensor will detect the degradation of the gas generating agent by sensing at least either one of a generation of a gas, a pressure change, or a generation of heat, as a change occurable as a result of the degradation of the gas generating agent.

More concretely, the inflator may be configured as follows:
the inflator body includes:
an ignition device that ignites and burns the gas generating agent for producing a combustion gas; and
a housing that stores the gas generating agent and the ignition device and is provided with a gas discharge port via which the inflation gas, which is composed of the combustion gas, is discharged; and
the sensor is disposed on an inner surface of a region of the housing where the gas generating agent is stored, and at a position remote from a straight line connecting an ignition region of the gas generating agent by the ignition device and the gas discharge port.

Alternatively, the inflator may be configured as follows:
the inflator body includes:
an ignition device that ignites and burns the gas generating agent for producing a combustion gas;
a compressed gas that is mixed with the combustion gas of the gas generating agent at actuation of the inflator for producing the inflation gas; and
a housing that stores the gas generating agent, the ignition device and the compressed gas;
the housing includes:
a combustion chamber that stores the gas generating agent and the ignition device;
a compressed gas chamber that stores the compressed gas and is provided with a gas discharge port via which the inflation gas is discharged; and
a gas outflow port that provides gas communication between the combustion chamber and the compressed gas chamber such that the combustion gas flows out of the combustion chamber into the compressed gas chamber via the gas outflow port, and is mixed with the compressed gas for producing the inflation gas; and
the sensor is disposed on an inner surface of a region of the combustion chamber where the gas generating agent is stored, and at a position remote from a straight line connecting an ignition region of the gas generating agent by the ignition device and the gas outflow port.

In either configurations, the sensor is disposed at the position remote from the straight line connecting the ignition region of the gas generating agent by the ignition device and the gas discharge port or gas outflow port. These configurations will help prevent the sensor from being exposed to the combustion gas of the gas generating agent continuously during a time period from the ignition to the completion of combustion of the gas generating agent. That is, the above-described configurations will prevent the sensor from being pressed by the hot combustion gas heading towards the gas discharge port or gas outflow port in a continued fashion throughout the combustion of the gas generating agent, and therefore, further prevent the sensor from breaking, coming off, or flying out of the housing via the gas discharge port.

In these instance, it is desired that the sensor is disposed proximate to the ignition device.

With this configuration, the sensor, in addition to being disposed at the position remote from the straight line connecting the ignition region of the gas generating agent by the ignition device and the gas discharge port or gas outflow port, is disposed proximate to the ignition device. Since the area proximate to the ignition device is the last area where the gas generating agent is subjected to combustion, the time period that the sensor can be exposed to the combustion gas will be further reduced, thus the sensor will be further prevented from breaking, coming off, or flying out of the housing via the gas discharge port.

It is further desired in the above inflator that a detecting unit of the sensor, which detects a degradation of the gas generating agent, is disposed on the inner surface of the inflator body in such a fashion as to be exposed to the gas generating agent.

With this configuration, the detecting unit is in contact with the gas generating agent, and therefore is capable of detecting a degradation of the gas generating agent directly and quickly.

the sensor is disposed at an inner surface of a region of the housing where the gas generating agent is stored, in an exposed fashion.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
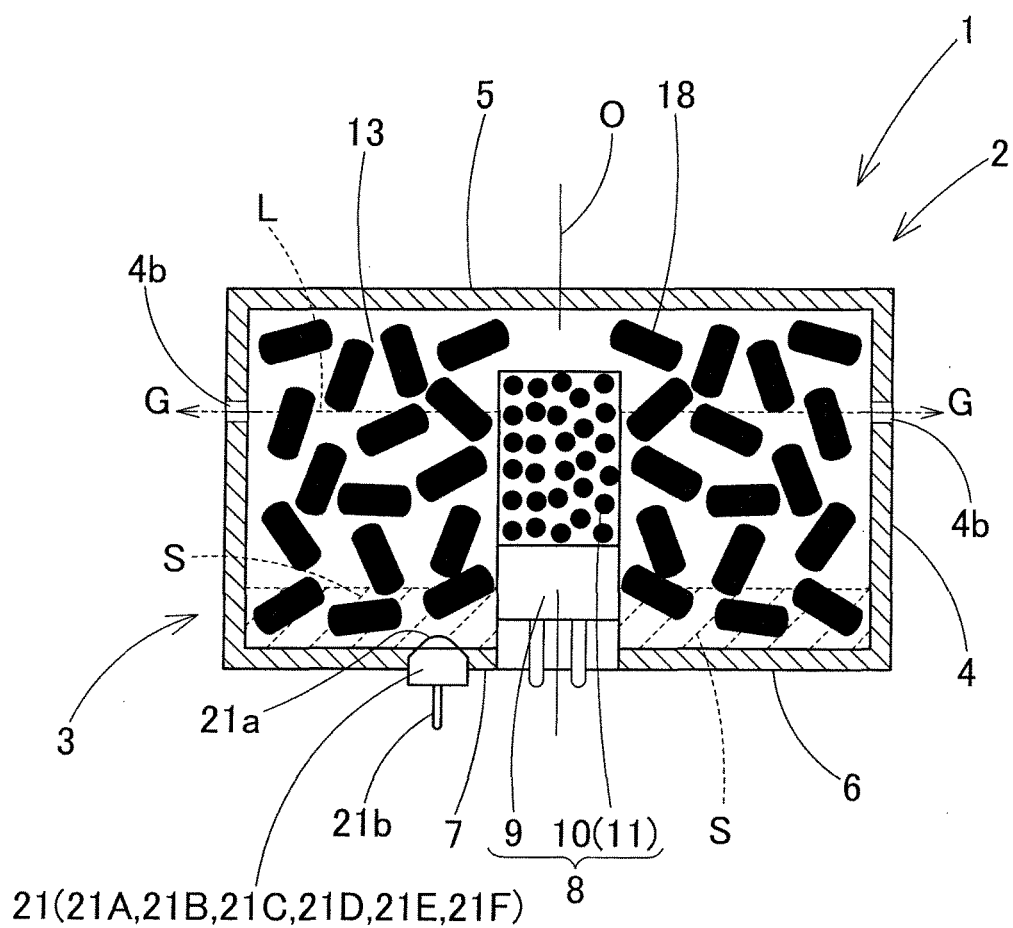
FIG. 1 is a schematic vertical section of an inflator embodying the invention.

An inflator 1 embodying the invention is a pyrotechnic inflator which is formed into a pot-like shape as shown in FIG. 1 for use in an airbag device for a vehicle.

The inflator 1 includes an inflator body 2 which generates an inflation gas G by burning a gas generating agent 18 and a sensor 21 which is mounted on the inflator body 2 and is capable of detecting a degradation of the gas generating agent 18. The sensor 21 will have a wired or wireless connection to a later-described detecting control device 30 when mounted on board.

The inflator body 2 generates an inflation gas G by burning the gas generating agent 18. The inflator body 2 is designed to be electrically connected to a control device of a vehicle through a signal wire (not shown) such that it is actuated in response to an actuating signal fed from the control device and generates an inflation gas G by igniting the gas generating agent 18 with a later-described ignition device 8.

As shown in FIG. 1, the inflator body 2 includes a housing 3, an ignition device 8 disposed inside the housing 3 and the gas generating agent 18 stored inside the housing 3. In the following specification, an up and down direction is intended to refer to a direction extending along an axial direction of the housing 3. That is, an upper side refers to a region in which a later-described ceiling wall 5 of the housing 3 is disposed and a lower side refers a region in which a later-described bottom wall 6 of the housing 3 is disposed.

The housing 3 is fabricated of a steel plate, and includes a circumferential wall 4 which is formed into a generally tube, a ceiling wall 5 and a bottom wall 6 which lid opposite end regions in an axial direction of the circumferential wall 4. The circumferential wall 4 is provided, in the region in a vicinity of the ceiling wall 5, a plurality of gas discharge ports 4b for emitting the inflation gas G. The gas discharge ports 4 are arranged along a circumferential direction of the circumferential wall 4 in a radial and equally interspaced fashion. Each of the gas discharge ports 4b is sealed, on the inner side, with a breakable sealing member (not shown) which is composed of an aluminum tape or the like and is tearable at high pressure.

The inflator 1 of the illustrated embodiment is provided with only one ignition device 8 for igniting the gas generating agent 18. As shown in FIG. 1, the ignition device 8 is located at the center of and inside the housing 3. More specifically, the ignition device 8 is disposed generally at the center of the bottom wall 6 of the housing 3 and along the central axis of the housing 3. The ignition device 8 includes an initiator 9 which is held at a vicinity of the bottom wall 6 and an ignition charge 10 disposed at a vicinity of the ceiling wall 5. The ignition charge 10 is ignited and combusted for building a fire when the initiator 9 is actuated, and the fire propagates into a storage 13 where the gas generating agent 18 is stored, such that the gas generating agent 18 is ignited and burnt. In the illustrated embodiment, the ignition charge 10 serves as an ignition region 11 of the gas generating agent 18. In the illustrated embodiment, the height of the initiator 9 from the bottom wall 6 is about one third of the height of the inflator 1. The ignition charge 10 (i.e., the ignition region 11) is disposed farther towards the ceiling wall 5 than the initiator 9. That is, in the illustrated embodiment, the ignition region 11 (i.e., the ignition charge 10) is disposed away from the bottom wall 6 and at a higher position than an about one-third height of the inflator 1 from the bottom wall 6. The storage 13 refers to a generally tubular space surrounding the ignition device 8 inside the housing 3. The storage 13 serves as a combustion chamber of the gas generating agent 18.

The gas generating agent 18 used in the illustrated embodiment is formed by molding a mixture of a predetermined fuel and a predetermined oxidizing agent into granules by extrusion molding or pressure molding. Usable as the gas generating agent 18 of the embodiment is a general-purpose gas generating agent which is normally used in an inflator for an airbag device, such as those containing guanidine, tetrazole, triazine, hydrazine, triazole, azodicarbonamide, bitetrazole, or ammonium nitrate as a major ingredient. However, the gas generating agent usable as the gas generating agent of the embodiment should not be limited thereby. The gas generating agent 18 used in this specific embodiment is a guanidine-based agent.

The gas generating agent 18 produces $N_2$, $CO_2$ and $H_2O$ at normal combustion whereas it can produce $NO_x$, $NH_3$, $CO$, $H_2$, $CH_4$ and $C_2H_6$ other than $N_2$, $CO_2$ and $H_2O$ when it is decomposed due to degradation.

The sensor 21 is designed to detect a degradation of the gas generating agent 18 and generate an output signal intensity such as voltage indicating the degree of degradation. The sensor 21 includes a detecting unit 21a which is capable of detecting a degradation of the gas generating agent 18 and an output unit 21b which protects the detecting unit 21a as well as receives an information from the detecting unit 21a, transforms the information into an output signal intensity. The sensor 21 is designed to detect a degradation of the gas generating agent 18 based on a gas concentration, a pressure and a temperature at the periphery of the gas generating agent 18.

The sensor 21 preferably includes at least either one of a gas sensor 21A, a pressure sensor 21B and a temperature sensor 21C.

With such a configuration, the sensor 21 will be capable of detecting a degradation of the gas generating agent 18 based on at least either one of a gas generation, a pressure change and a heat generation as a change derived from the degradation of the gas generating agent 18.

Generally speaking, a gas sensor detects a gas concentration and transforms it to an output signal intensity, and is provided with a sensor element which reacts to a certain kind of gas. That is, the gas sensor needs to be one suitable for detecting a gas which can be generated from the gas generating agent 18. The gas sensor 21A of this specific embodiment is configured to detect a gas of NOX, CO, NH3, H2 or the like which can be produced due to degradation of the guanidine-based gas generating agent 18.

The gas sensor 21A can be a general-purpose sensor, or a custom-built sensor customized according to the condition of use.

Gas generating agents can deteriorate under any storage conditions. As the degradation proceeds, the concentration of the gas is increased. The concentration of the gas at which a replacement of an inflator is required can be determined according to the kind of gas generating agent. The concentration of the gas at which a replacement of an inflator is required will be hereinafter called a "replacement concentration."

In the illustrated embodiment, the gas sensor 21A is mounted on the inflator 1 at a position remote from straight lines L connecting the ignition region 11 (i.e., ignition charge 10) of the gas generating agent 18 and each of the gas discharge ports 4b by the shortest way, and at a region S in which the gas generating agent 18 is stored. The gas sensor 21A of this specific embodiment is disposed at a vicinity of the center of the bottom wall 6 and proximate to the ignition device 8.

In the illustrated embodiment, as shown in FIG. 1a, the detecting unit 21a is disposed at an inner surface of the storage 13 (i.e., at an inner surface of the bottom wall 6 of the housing 3) in an exposed fashion. A remaining region of the gas sensor 21A except the detecting unit 21a is embedded in the bottom wall 6.

Figure 2:
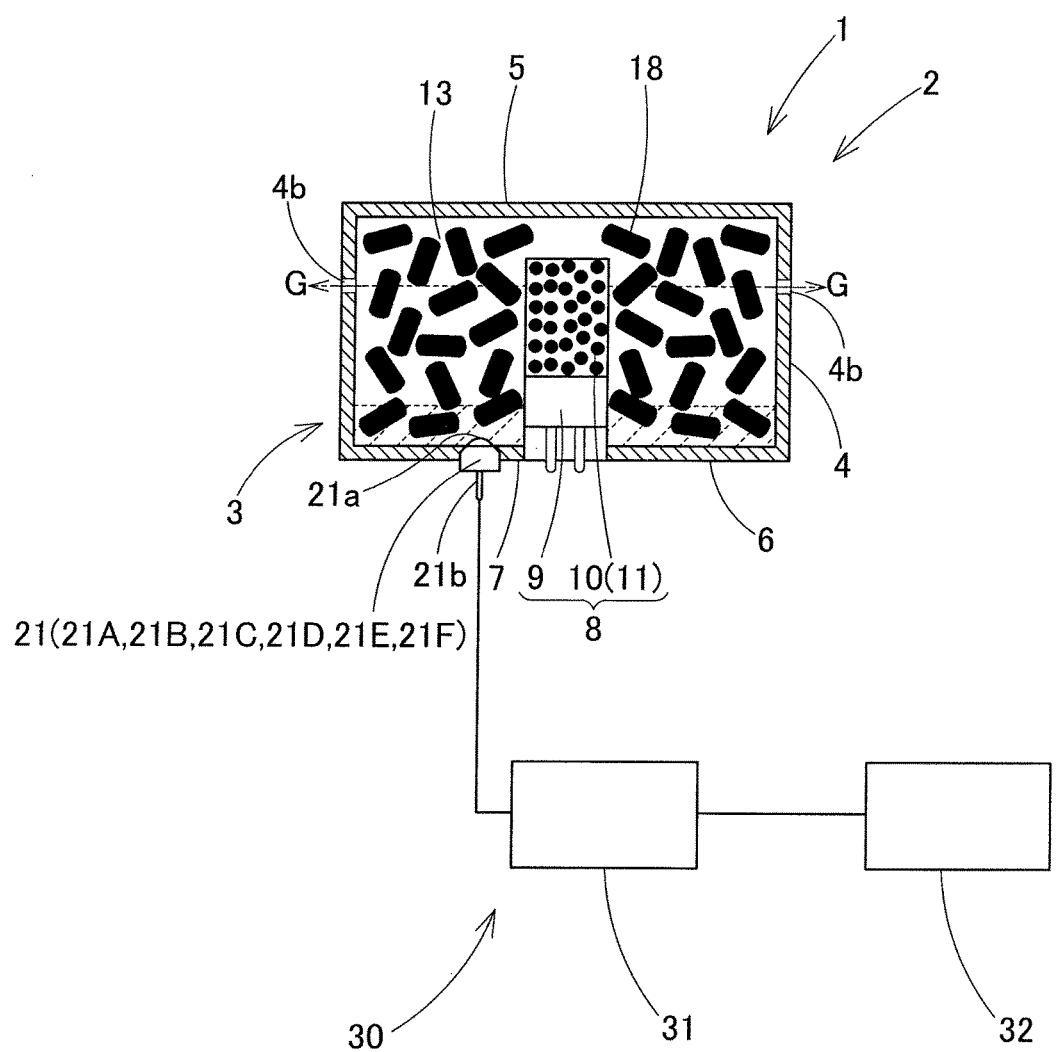
FIG. 2 schematically depicts the inflator of FIG. 1 and a detection control device.

As shown in FIG. 2, the gas sensor 21A is electrically connected to the detecting control device 30. The detecting control device 30 includes an analyzing unit 31 and an announcing unit 32. It can be arbitrarily determined whether the analyzing unit 31 and announcing unit 32 are integral or disposed separately. The analyzing unit 31 is provided with a calibration curve in which the relationship between a signal intensity and a concentration is plotted.

The gas sensor 21A feeds a signal intensity to the detecting control device 30 form the output unit 21b. The analyzing unit 31 of the device 30 analyzes the signal intensity and determines whether the signal intensity exceeds a signal intensity corresponding to the replacement concentration using the calibration curve. If it exceeds the replacement concentration, the announcing unit 32 announces the degradation of the gas generating agent 18. The detection control device 30 may be configured to announce the degradation of the gas generating agent 18 in a multilevel fashion since a degradation of the gas generating agent 18 proceeds gradually.

The announcement method of the announcing unit 32 can be arbitrarily determined. It can perform the announcement visually through a display, or through a sound. It is also conceivable that a degradation of the gas generating agent 18 is listed as an item to be checked at regular inspection.

Detection of the degradation of the gas generating agent 18 may be carried out on a real-time basis, or on a periodic basis. When performing the detection on a real-time basis, the analyzing unit 31 may include a memory or the like. When performing periodically, it is conceivable to do so every time the engine is started. The inflator 1 of the illustrated embodiment is capable of informing a user of a degradation of the gas generating agent 18 stored therein with the sensor 21. When the degree of degradation is such as to necessitate a replacement of the inflator 1, the inflator 1 or an airbag device equipped with the inflator 1 can be replaced with a new one. Therefore, the inflator 1 of the embodiment is capable of exerting a desired power when actuated.

The sensor 21 of the illustrated embodiment is composed of the gas sensor 21A. The gas sensor 21A is capable of detecting a production of a gas owing to the degradation of the gas generating agent 18. Instead of the gas sensor 21A, a pressure sensor 21B or a temperature sensor 21C may also be employed as the sensor of the embodiment as described later.

In the inflator 1 of the foregoing embodiment, the sensor 21 is disposed at the position remote from the straight lines L connecting the ignition region 11 (i.e., the ignition charge 10) of the gas generating agent 18 and each of the gas discharge ports 4b by the shortest way, and at an inner surface of a region S of the housing 3 where the gas generating agent 18 is stored. This configuration will help prevent the gas sensor 21A from being exposed to a combustion gas of the gas generating agent 18 continuously during a time period from the ignition to the completion of combustion of the gas generating agent 18. That is, the above-described configuration will prevent the sensor 21A from being pressed by the hot combustion gas G1 heading towards the gas discharge ports 4b in a continued fashion throughout the combustion of the gas generating agent 18, and therefore, further prevent the gas sensor 21A from breaking, coming off, or flying out of the housing 3 via the gas discharge ports 4b. If such an advantageous effect does not have to be considered, the sensor may be disposed at a position close to the straight lines connecting the ignition region of the gas generating agent 18 and each of the gas discharge ports.

Moreover, the gas sensor 21A of the foregoing embodiment is disposed proximate to the ignition device 8. That is, the gas sensor 21A, which is disposed at the position remote from the straight lines L connecting the ignition region 11 (i.e., the ignition charge 10) of the gas generating agent 18 and each of the gas discharge ports 4b by the shortest way, is disposed proximate to the ignition device 8. Since the area proximate to the ignition device 8 is the last area where the gas generating agent 18 is subjected to combustion, the time period that the sensor 21A can be exposed to the combustion gas will be further reduced, thus the sensor 21A will be further prevented from breaking, coming off, or flying out of the housing 3 via the gas discharge ports 4b. In the foregoing embodiment, especially, the gas sensor 21A is disposed at a vicinity of the center of the bottom wall 6 of the housing 3. The ignition device 8 is so configured that the initiator 9 is disposed towards the bottom wall 6 while the ignition charge 10 (i.e., the ignition region 11) is disposed towards the ceiling wall 5. The ignition charge 10 (i.e., the ignition region 11) is located at a higher position than an about one-third height of the inflator 1 from the bottom wall 6. That is, the gas sensor 21A disposed at a vicinity of the center of the bottom wall 6 of the housing 3 is remote from the ignition region 11 (i.e., the ignition charge 10) and is set back far from the gas discharge ports 4b. This configuration will help prevent the gas sensor 21A from breaking, coming off, or flying out of the housing 3 via the gas discharge ports 4b in an adequate fashion. If such an advantageous effect does not have to be considered, the sensor may be disposed at a position remote from the ignition device, such as on the circumferential wall of the housing. The straight lines L connecting the ignition region 11 and each of the gas discharge ports 4b by the shortest way are straight lines L which are orthogonal to a central axis O of the inflator 1 and pass through each of the gas discharge ports 4b.

In the inflator 1 of the foregoing embodiment, the detecting unit 21a of the gas sensor 21A is disposed on the inner surface of the storage 13 (i.e., on the inner surface of the bottom wall 6 of the housing 3) of the inflator body 2 in an exposed fashion. With this configuration, the detecting unit 21a is in contact with the gas generating agent 18, and therefore is capable of detecting a degradation of the gas generating agent 18 directly and quickly. If such an advantageous effect does not have to be considered, the detecting unit of the sensor does not necessarily have to be exposed on the inner surface of the storage. In the foregoing embodiment, additionally, the region of the gas sensor 21A except the detecting unit 21a is embedded in the bottom wall 6 of the housing 3. This configuration will help prevent the gas sensor 21A from breaking, coming off, or flying out of the housing 3 via the gas discharge ports 4b in a further secure fashion. If such an advantageous effect does not have to be considered, not only the detecting unit but also the region except the detecting unit may be disposed in such a manner as to be exposed on the inner surface of the storage of the housing.

Instead of the gas sensor 21A, a pressure sensor 21B or a temperature sensor 21C can also be used as the sensor 21 of the embodiment. A corrosion sensor 21D, an optical sensor 21E, and a humidity sensor 21F can also serve as the gas sensor 21A. Any sensor may be employed as the sensor 21 of the embodiment on condition that it is capable of detecting a degradation of the gas generating agent 18.

The pressure sensor 21B transforms a pressure value to an output value. There are various types of pressure sensor according to measurement method, such as a type using a diaphragm, a type using a bellows, and a strain gauge. The pressure sensor 21B detects a pressure increase inside the housing 3 due to generation of a gas caused by degradation of the gas generating agent 18. The pressure sensor 21B can be a general-purpose sensor, or a custom-built sensor customized according to the condition of use.

The temperature sensor 21C transforms a temperature value, which is an index of heat, to an output value. There are various types of temperature sensor such as a thermo-electromotive force temperature sensor, a resistance temperature detector, a thermal expansion detector, a heat discoloration detector, an infrared thermometer, and a thermal fuse. The temperature sensor 21B detects a temperature elevation inside the housing 3 due to generation of a gas caused by degradation of the gas generating agent 18. Since the temperature inside the inflator 1 can be affected by an ambient temperature, the temperature can drop after once having been raised to such a value that indicates a degradation of the gas generating agent 18. However, if the temperature has once been raised to the value indicating the degradation, the gas generating agent 18 is deteriorated and cannot exert a desired action any more. To address this problem, the temperature sensor 21C is desirably provided with a memory or the like which can store temperature data to show whether the temperature has exceeded a predetermined temperature indicating a degradation of the gas generating agent 18 or not. The temperature sensor 21C can be a general-purpose sensor, or a custom-built sensor customized according to the condition of use.

The corrosion sensor 21D can be composed by, by way of example, disposing a detector element such as a metal wire which can be corroded by an oxidized material as $NO_x$ and an oxidized gas contained in a product of deterioration, inside the housing 3. Silver can be used to form the detector element, by way of example. If the gas generating agent 18 is deteriorated and generates the oxidized material or gas, the oxidized material or gas corrodes the detector element. The corrosion sensor 21D detects the corrosion as a change in electric resistance, thereby detects the degradation of the gas generating agent 18. More specifically, when the gas generating agent 18 is not deteriorated, the resistance is small. As the degradation proceeds, an oxidized material and/or gas is generated and corrodes the detector element, thus the resistance is raised and the corrosion sensor 21D detects the degradation of the gas generating agent 18.

The optical sensor 21E can be composed by, by way of example, disposing a detector element made from such a metal as silver that can discolor or tarnish by an oxidized material as $NO_x$ and an oxidized gas contained in a product of deterioration of the gas generating agent 18, inside the housing 3. The optical sensor 21E irradiates a light on the detector element and detects a degradation of the gas generating agent 18 as a change in optical reflectivity of the surface of the detector element. More specifically, when the gas generating agent 18 is not deteriorated, the detector element has a high optical reflectivity. As the degradation proceeds, an oxidized material and/or gas is generated and discolors or tarnishes the detector element, thus the optical reflectivity of the detector element falls off and the optical sensor 21E detects the degradation of the gas generating agent 18. The optical sensor 21E can also be composed of an image sensor such as a CMOS or CCD and/or a photodiode which is capable of catching a change in surface color or shape of the gas generating agent 18 itself caused by degradation of the gas generating agent 18.

The humidity sensor 21F perceives $H_2O$ which is contained in a product of deterioration of the gas generating agent 18, as humidity. The humidity sensor 21F detects a degradation of the gas generating agent 18 by perceiving the humidity. The humidity sensor 21F can be a general-purpose sensor, or a custom-built sensor customized according to the condition of use.

More than one sensor out of the above-described sensors can be employed as the sensor 21. That way a degradation of the gas generating agent 18 can be detected from various perspectives. By way of example, more than one gas sensors 21A each of which is for detecting different chemical compounds such as NOX, CO, NH3 may be employed concurrently. That way the sensors 21A will exert a higher detecting performance even if the gas generating agent 18 is deteriorated in a one-side fashion. It is also conceivable to employ the gas sensor 21A, pressure sensor 21B and temperature sensor 21C concurrently. That way the degradation of the gas generating agent 18 will be detected from various perspectives. Further, the gas sensor 21 may include a plurality of sensing functions.

Although the inflator 1 of the foregoing embodiment includes only one ignition device 8, the inflator of the invention may be provided with more than one ignition devices.

Figure 3:
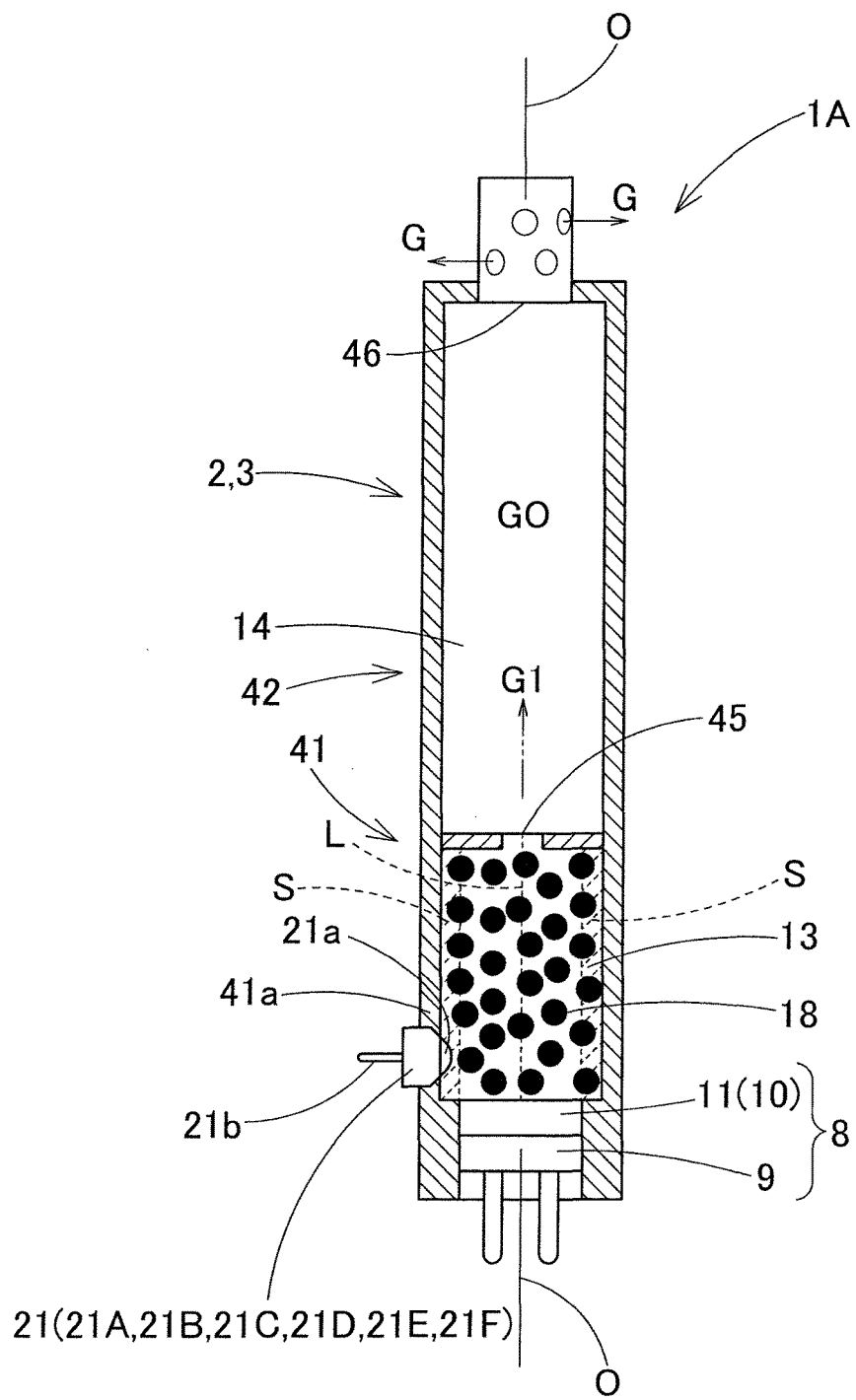
FIG. 3 is a schematic vertical section of an alternative embodiment of the inflator.

FIG. 3 depicts an inflator 1A, an alternative embodiment of the invention. The inflator 1A is cylindrical in shape and is a hybrid inflator. However, it is needless to say that the invention can be applied to an inflator regardless of the method of generating an inflation gas and the shape of the inflator.

The inflator 1A, commonly referred to as a hybrid inflator, stores a compressed gas G0 and a gas generating agent 18 there inside. The inflator 1A includes a combustion chamber 41 and a compression gas chamber 42 inside the housing 3. The combustion chamber 41 stores a gas generating agent 18 and an ignition device 8, and is provided with a gas outflow port 45 via which a combustion gas G1 produced by combustion of the gas generating agent 18 flows into the compressed gas chamber 42. The compressed gas chamber 42 stores a compressed gas G0 and is designed to be brought into communication with the combustion chamber 41 via the gas outflow port 45 such that the combustion gas G1 mixes with the compressed gas G0 to form an inflation gas G. The compressed gas chamber 42 is provided with a plurality of gas discharge ports 46. The gas outflow port 45 is sealed with a burst disc (not shown) which is designed to collapse when the gas generating agent 18 is burnt upon actuation of the ignition device 8. The compressed gas chamber 42 is provided, at a communication region with the gas discharge ports 46, with a burst disc (not shown) which is designed to collapse when an internal pressure of the compressed gas chamber 42 is boosted due to production of the inflation gas G. The ignition device 8 includes an initiator 9 and an ignition charge 10 in a similar fashion to the inflator 1 of the foregoing embodiment. The ignition charge 10 constitutes an ignition region 11 of the gas generating agent 18. A sensor 21 is mounted on the combustion chamber 41 at a position remote from a straight line L connecting the ignition region 11 (i.e., ignition charge 10) of the gas generating agent 18 and the gas outflow port 45 by the shortest way, and at a region S in which the gas generating agent 18 is stored such that the sensor 21 is in contact with the gas generating agent 18. The straight line L of the inflator 1A passes through the gas outflow port 45 and is coincident with or in parallel to a central axis O of the inflator 1A. More specifically, the sensor 21 is attached to a region proximate to the ignition device 8 (to a region of a circumferential wall 41a of the combustion chamber 41 proximate to the ignition device 8). The sensor 21 is electrically connected to a detecting control device 30 in a similar fashion to the inflator 1 of the foregoing embodiment.

The detecting control device 30 may be configured to detect and announce a degradation of the gas generating agent 18 not only after the inflator 1 is mounted on a vehicle but also before the inflator 1 is mounted on the vehicle such that only a normal inflator 1 is mounted on the vehicle.

What is claimed is:

1. An inflator comprising an inflator body that produces an inflation gas by burning a gas generating agent and a sensor that is mounted on the inflator body and is capable of detecting a degradation of the gas generating agent, wherein:
   the inflator body comprises:
      an ignition device that ignites and burns the gas generating agent for producing a combustion gas; and
      a housing that stores the gas generating agent and the ignition device and is provided with a gas discharge port via which the inflation gas, which is composed of the combustion gas, is discharged; and
   the sensor is disposed on an inner surface of a region of the housing where the gas generating agent is stored, at a position remote from a straight line connecting an ignition region of the gas generating agent by the ignition device and the gas discharge port.

2. The inflator according to claim 1, wherein the sensor is composed of at least either one of a gas sensor, a pressure sensor or a temperature sensor.

3. The inflator according to claim 1, wherein the sensor is disposed proximate to the ignition device.

4. The inflator according to claim 1, wherein a detecting unit of the sensor, which detects a degradation of the gas generating agent, is disposed on an inner surface of the inflator body in such a fashion as to be exposed to the gas generating agent.

5. An inflator comprising an inflator body that produces an inflation gas by burning a gas generating agent and a sensor that is mounted on the inflator body and is capable of detecting a degradation of the gas generating agent, wherein:
   the inflator body comprises:
      an ignition device that ignites and burns the gas generating agent for producing a combustion gas;
      a compressed gas that is mixed with the combustion gas of the gas generating agent at actuation of the inflator for producing the inflation gas; and
      a housing that stores the gas generating agent, the ignition device and the compressed gas;
   the housing comprises:
      a combustion chamber that stores the gas generating agent and the ignition device;
      a compressed gas chamber that stores the compressed gas and is provided with a gas discharge port via which the inflation gas is discharged; and
      a gas outflow port that provides gas communication between the combustion chamber and the compressed gas chamber such that the combustion gas flows out of the combustion chamber into the compressed gas chamber via the gas outflow port, and is mixed with the compressed gas for producing the inflation gas; and
   the sensor is disposed on an inner surface of a region of the combustion chamber where the gas generating agent is stored, and at a position remote from a straight line connecting an ignition region of the gas generating agent by the ignition device and the gas outflow port.

6. The inflator according to claim 5, wherein the sensor is disposed proximate to the ignition device.

* * * * *